(12) United States Patent
Uno et al.

(10) Patent No.: US 7,859,458 B2
(45) Date of Patent: *Dec. 28, 2010

(54) TRANSMITTING DEVICE, RECEIVING DEVICE AND METHOD FOR ESTABLISHING A WIRELESS COMMUNICATION LINK

(75) Inventors: Masahiro Uno, Fellbach (DE); Zhaocheng Wang, Stuttgart (DE)

(73) Assignee: Sony Deutschland GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/475,877

(22) Filed: Jun. 1, 2009

(65) Prior Publication Data

US 2009/0231194 A1 Sep. 17, 2009

Related U.S. Application Data

(63) Continuation of application No. 11/865,366, filed on Oct. 1, 2007, now Pat. No. 7,551,135.

(30) Foreign Application Priority Data

Oct. 9, 2006 (EP) .................................. 06021152

(51) Int. Cl.
*H04L 12/56* (2006.01)
*H01Q 1/00* (2006.01)
(52) U.S. Cl. ..................................................... 342/367
(58) Field of Classification Search ................. 342/367, 342/368, 372; 455/69–70, 562.1
See application file for complete search history.

(56) References Cited

U.S. PATENT DOCUMENTS

| | | | |
|---|---|---|---|
| 4,696,053 | A | 9/1987 | Mastriani et al. |
| 7,551,135 | B2 * | 6/2009 | Uno et al. ................... 342/367 |
| 2003/0109285 | A1 | 6/2003 | Reed et al. |
| 2006/0040675 | A1 | 2/2006 | Halfmann et al. |
| 2007/0015511 | A1 | 1/2007 | Kwun et al. |

FOREIGN PATENT DOCUMENTS

| | | |
|---|---|---|
| JP | 8-271561 | 10/1996 |
| WO | WO 98/25362 | 6/1998 |

(Continued)

OTHER PUBLICATIONS

Erdem Ulukan, et al. "Angular MAC Protocol with Location Based Scheduling for Wireless Ad Hoc Networks" IEEE Xplore, 2005, 6 pages.

(Continued)

*Primary Examiner*—Thomas H Tarcza
*Assistant Examiner*—Fred H Mull
(74) *Attorney, Agent, or Firm*—Oblon, Spivak, McClelland, Maier & Neustadt, L.L.P.

(57) ABSTRACT

A method for establishing a wireless communication link between a first communication device having a beam antenna to be steered to different positions and a second communication device. The method includes transmitting a link request signal from the first communication device to the second communication device via the beam antenna. The link request signal includes information relating to a current position of the beam antenna. The method further includes obtaining, in case the link request signal is received in the second communication device, channel quality information representative of a current transmission path.

17 Claims, 3 Drawing Sheets

System concept

FOREIGN PATENT DOCUMENTS

WO    WO 00/38452    6/2000

OTHER PUBLICATIONS

Dhananjay Lal, et al. "Performance Evaluation of Medium Access Control for Multiple-Beam Antenna Nodes in a Wireless LAN" IEEE Transactions on Parallel and Distributed Systems, vol. 15, No. 12, Dec. 2004, pp. 1117-1129.

"Physical channels and mapping of transport channels onto physical channels (FDD)" $3^{rd}$ Generation Partnership Project (3GPP), Technical Specification Group (TSG), Radio Access Network (RAN), Working Group 1(WG1), TS 25.211 V2.0.0, Apr. 1999, 36 pages.

* cited by examiner

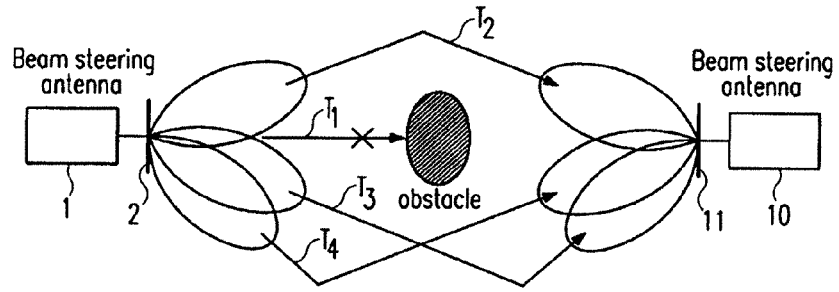
Fig. 1 : System concept
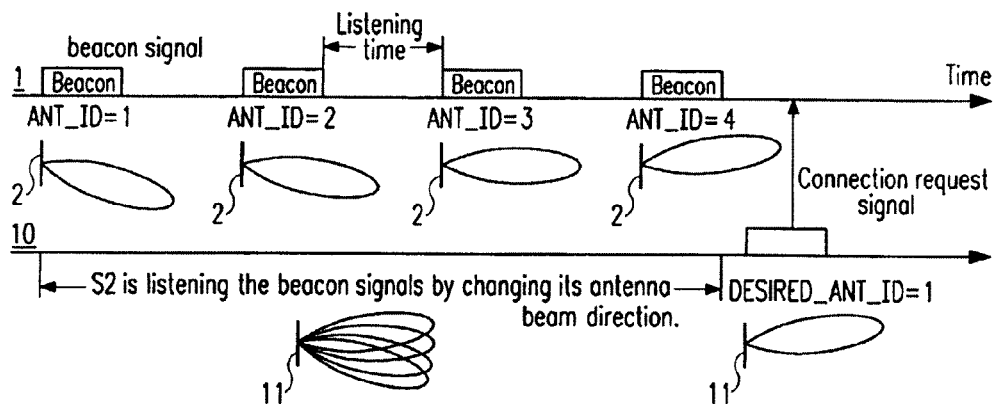
Fig. 4 : Example of initial sequence (Beacon transmission and connection request signal)
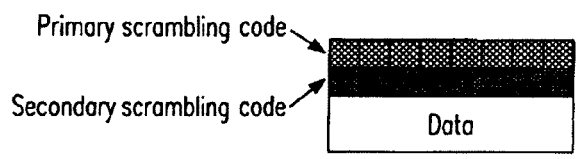
Fig. 7 : Another possibility of scrambling

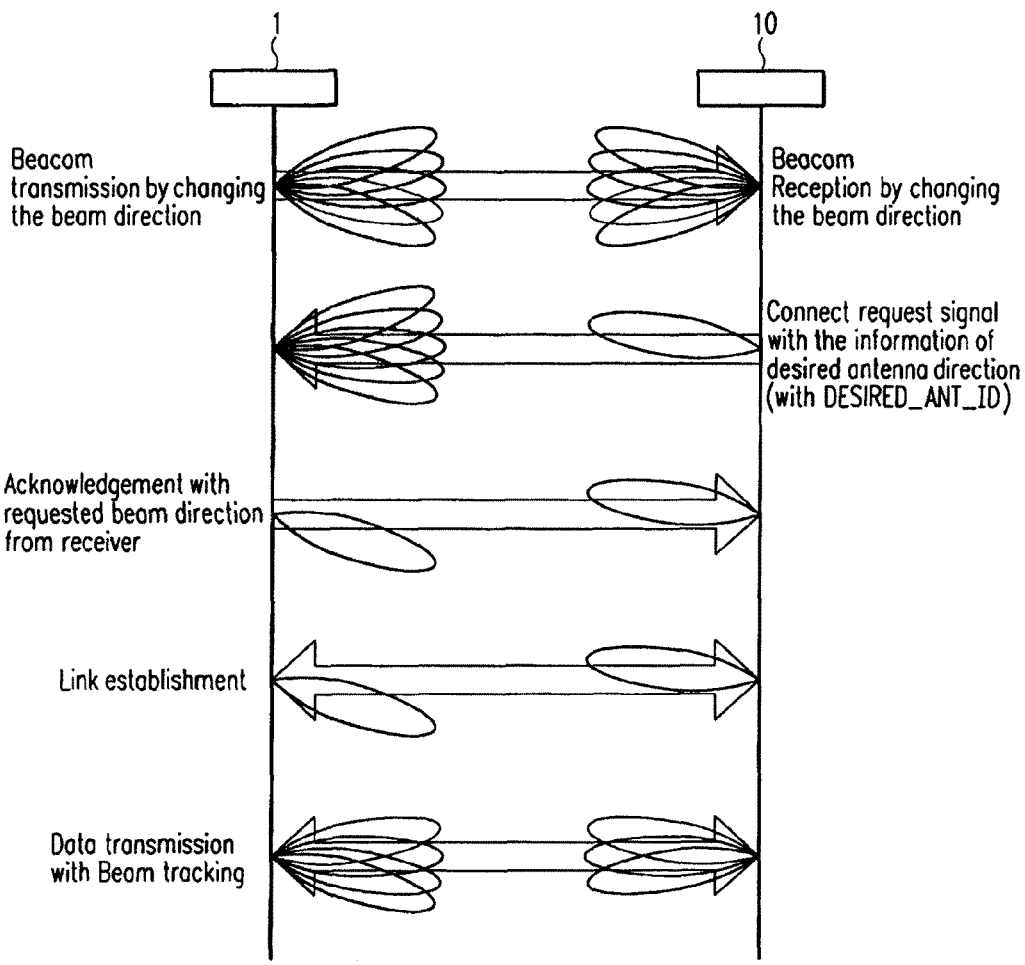
Fig. 5: Sequence chart of the invention
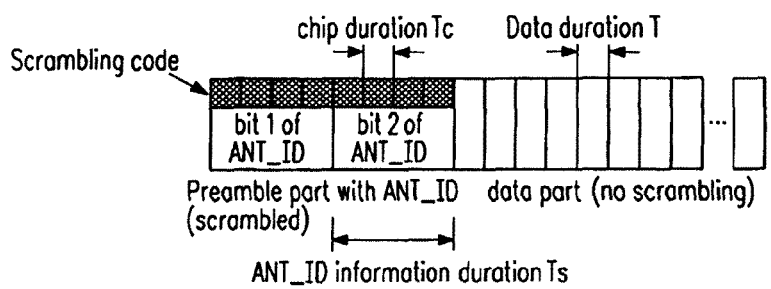
Fig. 6: Example of scrambling on beacon (Spreading factor = 4 for Preamble part)

TRANSMITTING DEVICE, RECEIVING DEVICE AND METHOD FOR ESTABLISHING A WIRELESS COMMUNICATION LINK

CROSS-REFERENCE TO RELATED APPLICATIONS

This application is a continuation of and is based upon and claims the benefit of priority under 35 U.S.C. §120 for U.S. Ser. No. 11/865,366, filed Oct. 1, 2007, the entire contents of this application is incorporated herein by reference. U.S. Ser. No. 11/865,366 claims the benefit of priority under 35 U.S.C. § 119 from European Application No. 06 021 152.1, filed on Oct. 9, 2006.

BACKGROUND OF THE INVENTION

1. Field of the Invention

The present invention related to a transmitting device and a receiving device for a wireless communication system, as well as to a method for establishing a wireless communication link between such a transmitting device and receiving device.

2. Discussion of the Background

The present invention is particularly directed to problems and solutions associated with the establishment of a communication link between a transmitting device and a receiving device for a wireless communication system, in which at least the transmitting device comprises a narrow beam antenna which can be steered to different positions in order to transmit and eventually receive signals in a wireless communication system. The receiving device can either also have a narrow beam antenna which can be steered to different positions or a wider beam or even omni-directional antenna.

SUMMARY OF THE INVENTION

At a given moment when transmitting device starts to try to establish a communication link with a receiving device, the narrow beam antenna of the transmitting device may be in anyone of the available positions. For this particular position of the narrow beam antenna of the transmitting device, the corresponding channel quality of the associated transmission path may not be sufficient for the receiving device to receive a link request signal transmitted from the transmitting device. For example, there might be an obstacle blocking this specific transmission path or channel quality might be decreased for other reasons. The transmitting device has to vary the position of the narrow beam antenna until a position for the narrow beam antenna has been found which provides a transmission path and therefore a communication link of a sufficiently good quality so that a communication with the receiving device can be established. The situation is even worse when both the transmitting device and the receiving device each comprise a narrow beam antenna which can be steered to different positions. At the moment at which the transmitting device tries to establish a communication with the receiving device, both narrow beam antennas might be totally misaligned so that the receiving device might not even receive any signal. Both the receiving device and the transmitting device then have to vary the positions of the respective narrow beam antenna until a link request signal of the communication device reaches the receiving device via a transmission path with a sufficiently high channel quality.

The object of the present invention is now to provide a transmitting device, a receiving device and a method for establishing a wireless communication link between a first communication device having a narrow beam antenna adapted to be steered into different positions and a second communication device, which enable the establishment of a communication link in a simple but effective and reliable manner.

The above object is achieved by a method for establishing a wireless communication link between a first communication device having a narrow beam antenna adapted to be steered into different positions and a second communication device. The method according to the present invention comprises the steps of transmitting a link request signal from the first communication device to the second communication device via said narrow beam antenna, wherein said link request signal comprises information relating to a current position of the narrow bean antenna, and obtaining, in case said link request signal is received in said second communication device, channel quality information representative of a current transmission path.

Advantageously, the narrow beam antenna is steered to different positions and link request signal is transmitted for each position, each of the link request signals comprising information relating to the respective position of the narrow beam antenna via which it is transmitted. Hereby, a sequence of the different positions of the narrow beam antenna is advantageously based on a predefined pattern. Hereby, the first communication device advantageously transmits information about the predefined pattern to said second communication device.

Further advantageously, a sequence of the different positions of the narrow beam antenna is based on random pattern.

Further advantageously, the first communication device, after transmitting of each link request signal, keeps the narrow beam antenna in the just used position in order to be able to receive an answer signal from a second communication device. Further advantageously, the second communication device, for each of said link request signals received in the second communication device, obtains channel quality information representative of the respective transmission path. Hereby, the second communication device, on the basis of the obtained channel quality information, advantageously determines a suitable transmission path for a communication link with said first communication device and sends a link confirmation signal comprising information relating to the corresponding position of the narrow beam antenna of the first communication device to said first communication device.

Further advantageously, the link request signal comprises a preamble, said preamble comprising the information relating to the current position of the narrow beam antenna.

The above object is further achieved by a transmission device for transmitting signals in a wireless communication system according to claim 10. The transmitting device according to the present invention comprises a narrow beam antenna adapted to be steered to different positions, an antenna steering means adapted to steer said narrow beam antenna into said different positions, signal generating means adapted to generate a link request signal comprising information relating to a current position of the narrow beam antenna, and a transmitting means adapted to transmit said link request signal to a receiving device via said narrow beam antenna.

Advantageously, the signal generating means is adapted to generate link request signals comprising information relating to each position of the narrow beam antenna, wherein, when said antenna steering means steers said narrow beam antenna to different positions, a link request signal is transmitted for each position, each of the link request signals comprising information relating to the respective position of the narrow beam antenna via which it is transmitted. Hereby, the antenna steering means advantageously steers the narrow beam antenna to the different positions based on a predefined pattern. Hereby, the transmitting means is advantageously adapted to transmit information about the predefined pattern to a receiving device.

Alternatively, the antenna steering means is advantageously adapted to steer the narrow beam antenna to the different positions based on a random pattern.

Further advantageously, after transmission of each link request signal the narrow beam antenna of the transmitting device is kept in the just used position in order to be able to receive and answer signal from a receiving device.

Further advantageously, the transmitting device comprises a receiving means adapted to receive, from a receiving device, a link confirmation signal comprising information relating to a position of the narrow beam antenna which is to be used for a communication with said receiving device.

Further advantageously, the link request signal comprises a preamble, said preamble comprising the information relating to the current position of the narrow beam antenna.

The above object is further achieved by a receiving device for receiving signals in a wireless communication system according to claim 18. The receiving device according to the present invention comprises an antenna, a receiving means adapted to receive signals via said antenna, and a channel quality determining means adapted to determine a channel quality from a receiving link request signal comprising information relating to a position of a narrow beam antenna of a transmitting device.

Advantageously, the channel determining means determines a channel quality for each link request signal received from a transmitting device, wherein a control means determines a suitable transmission path for a communication link with said transmission device and a signal generating means generates a link confirmation signal on the basis of the determined channel quality, said link confirmation signal comprising information about the corresponding position of the narrow beam antenna of the transmitting device, wherein the link confirmation signal is transmitted to the transmitting device.

Advantageously, the antenna of the receiving device is a narrow beam antenna which is adapted to be steered to different positions by means of an antenna steering means. The antenna steering means is advantageously adapted to steer the narrow beam antenna into different positions based on a random pattern. Alternatively, the antenna steering means is advantageously adapted to steer the narrow beam antenna into different positions based on a predefined pattern.

The present invention therefore enables the establishment of a communication link between a transmitting device and a receiving device in a simple but very effective and reliable manner. Specifically, since the link request signal transmitted from the transmitting device comprises information relating to the currently used position of the narrow beam antenna of the transmitting device, the receiving device, by determining the channel quality information for the receiving link request signal, is able to process and store information linking the respective antenna beam positions of the transmitting device to the respective channel quality of the transmission path and, by providing the transmitting device with corresponding information, to establish a communication with a good and reliable transmission quality. On the basis of the channel quality information obtained in the receiving device, the position of the narrow beam antenna of the transmitting device can therefore be steered to a position which is associated with a transmission path having a high or the best channel quality for the communication between the two devices. In addition, in case that the receiving device also comprises a narrow beam antenna which can be steered to different positions, the receiving device can control the positions of the narrow beam antenna of the transmitting device and its own narrow beam antenna position so that a communication link with the best channel quality is established. The present invention further enables a very quick link establishment as soon as one position of the narrow beam antenna (or the narrow beam antennas) is found, which ensures a communication link with a sufficiently high channel quality, so that it is possible to start a link establishment protocol immediately without further beam alignment optimisation, i.e. without having to find the or one of the best communication links. Obviously, after establishment of a communication link, a better or even the best communication link can be further searched by the transmitting and/or the receiving device. The present invention further enables to build an antenna device and/or receiving device with a much simpler and smaller antenna module, since an antenna means with only a steerable narrow beam antenna can be implemented. It is not necessary to additionally implement an omni-directional or wider beam antenna module, which supports the establishment of a communication link in the beginning of a communication. The present invention enables the quick and reliable establishment of a communication link only with a steerable narrow beam antenna, so that the costs, the size and the complexity of the transmitting device and/or the receiving device can be reduced. Further, because of the higher gain of a narrow beam antenna compared to omni-directional antennas or wider beam antennas, it is possible to increase the link budget and to reduce the multipath fading effects in the communication.

It is to be noted that the transmitting device, the receiving device as well as the method for establishing a wireless communication link according to the present invention may be adapted to operate in any kind of wireless communication system in which information data and the like are transmitted in wireless signals over a short, a mid or a long range. The transmitting device and receiving device can be any kind of portable and/or stationary equipments, devices, means, elements which enable and are adapted to transmit and receive signals in a wireless communication system. The narrow beam antenna which is comprised in the transmitting device of the present invention and eventually also in the receiving device of the present invention and can be any kind of antenna which has one beam or radiation direction which is more predominant than other beam or radiation directions and may also be called a sharp beam antenna, directional antenna or the like, in contrast to omni-directional antennas in which every beam direction is more or less equal. Further, the steering of the narrow beam antenna(s) can be realised by any possible technical implementation, e.g. by mechanical and/or electrical steering, by changing gain and/or phase of antenna elements forming the narrow beam antenna, by individually controlling one or more antenna elements of the number of antenna elements forming the narrow beam antenna or any other possible implementation. Advantageously, it should be assumed that the steering of the narrow beam antenna takes place step by step and not continuously.

BRIEF DESCRIPTION OF THE DRAWINGS

The present invention is further explained in the following description of preferred embodiments in relation to the enclosed drawings, in which FIG. 1 schematically visualises the link establishment between a transmitting device and a receiving device, FIG. 2 schematically shows a block diagram of a transmitting device according to the present invention, FIG. 3 schematically shows a block diagram of a receiving device of the present invention, FIG. 4 schematically shows the transmission of a number of link request signals from a transmitting device according to the present invention, FIG. 5 schematically shows a link establishment procedure between a transmitting device and a receiving device of the present invention, FIG. 6 schematically shows an example of scrambling of a link request signal, and FIG. 7 schematically shows a further example of scrambling a link request signal.

DESCRIPTION OF THE PREFERRED EMBODIMENTS

Figure 2:
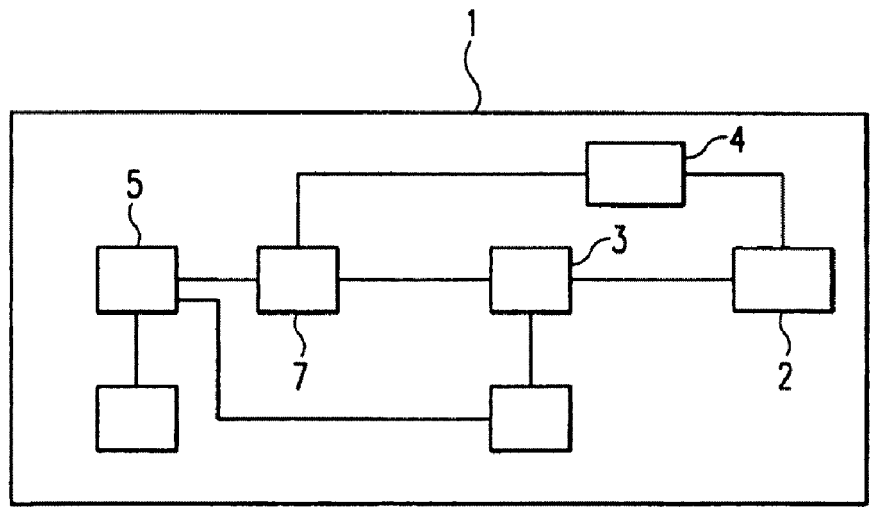

FIG. 1 schematically shows how a communication link between a transmitting device 1 and a receiving device 10 according to the present invention is established. The transmitting device 1 will be explained in more detail in relation to FIG. 2. The receiving device 10 will be explained in more detail in relation to FIG. 3.

The transmitting device 1 comprises a narrow beam antenna 2 which is adapted to be steered into different positions as shown in FIG. 1. In the example shown in FIG. 1, the receiving device 10 also has a narrow beam antenna 11 which is adapted to be steered to different positions. However, according to the present invention, the receiving device 10 may also have a wide beam or omni-directional antenna, which cannot be steered to a predominant beam position. In the example shown in FIG. 1, the narrow beam antennas 2 and 11 can be steered to different positions, so that a number of different transmission paths $T_1$, $T_2$, $T_3$ and $T_4$ between the transmitting device 10 are possible. In the shown example, one of the transmission paths, namely $T_1$, is blocked by an obstacle. This transmission path $T_1$ would also be the direct line of sight transmission path between the transmitting device 1 and the receiving device 10. The narrow beam antennas 12 and 11 therefore have to be steered to respective positions in which the exchange of data and a communication is possible. The transmission paths $T_2$, $T_3$ and $T_4$ which are indirect (no line of sight) transmission paths in which the transmitted signal is reflected towards the receiving device 10. From FIG. 1 it becomes immediately clear that an essential problem is to align the narrow beam antennas 2 and 11, i.e. to steer both antennas into a respective positions which enables the communication.

Figure 3:
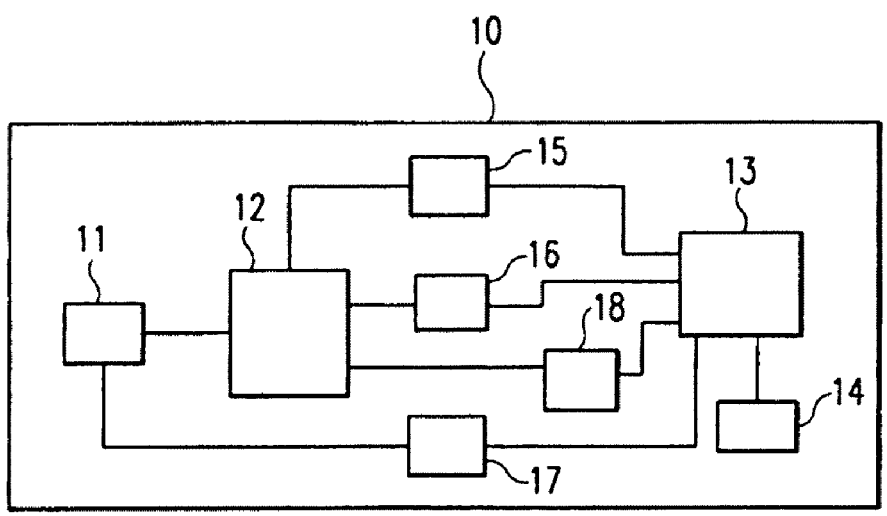

FIG. 2 shows a schematic block diagram of a transmitting device 1 according to the present invention. The transmitting device 1 is adapted to transmit and receive signals in a wireless communication system and therefore comprises all necessary elements and implementations in order to be able to perform the necessary functionalities. However, for the sake of clarity, FIG. 2 only shows and explains elements which are necessary for the understanding of the present invention. Further, it is to be noted that although the transmitting device 1 is called "transmitting device" throughout the present specification, it has to be understood that the transmitting device 1 is also adapted to receive signals in the wireless communication system. However, since the transmitting device 1 is a device which initiates the communication with the receiving device 10 by transmitting a link request signal, which is then answered by the receiving device 10, this wording was chosen. Similarly, the receiving device shown and explained in relation to FIG. 3 is also adapted to transmit signals in the wireless communication system. However, since the receiving device answers a link request signal received from the transmitting device 1 in order to establish a communication, this wording was chosen. Further, the transmitting device 1 could also comprise the elements and functionalities of the receiving device 10 and vice versa.

The transmitting device 1 comprises a narrow beam antenna 2 which is adapted to be steered to different positions by an antenna steering means 4 under the control of a control means 5. The control means can be any kind of suitable control means, e.g. a base band control means of the transmitting device 1 or any other suitable control unit. The transmitting device 1 further comprises a transceiving means 3 adapted to transmit and receive signals in a wireless communication system via the narrow beam antenna 2. The transceiver 3 is e.g. implemented as the high frequency part or radio frequency part of the transmitting device 1. The transmitting device 1 further comprises a signal generating means 7 which is adapted to generate link request signals which are then transmitted by the transceiver 3 via the narrow beam antenna 2 to the receiving device 10. The term "link request signal" is hereby intended to cover all kinds of possible signals which are initially transmitted from a transmitting device 1 in order to identify and/or signalise the presence of the transmitting device 1, request the establishment of a communication, and so forth, such as beacon signals and the like. The link request signals generated by the signal generating means 7 respectively comprise information relating to a respective position of the narrow beam antenna. At the beginning of the link establishment procedure, the narrow beam antenna 2 is steered to or already in a specific position and sends out a link request signal. This link request signal comprises information which relates to the current position of the narrow beam antenna 2. Information relating to a current position hereby means that the information indicates in which position the narrow beam antenna 2 was when the link request signal was transmitted. At the beginning of the link establishment procedure, the antenna steering means 4 steers the narrow beam antenna 2 to different positions, whereby in each position a corresponding link request signal generated by the signal generating means 7 comprising information about the respective position of the narrow beam antenna 2 is transmitted. This procedure is visualised in the upper line of FIG. 4 and the left side of FIG. 5. In both figures the link request signal is called "beacon signal". Further, in both figures, the information relating to the current position of the narrow beam antenna is called ANT_ID, i.e. an identification indicating the respective position and beam direction of the narrow beam antenna 2. As shown in the upper line of FIG. 4, the narrow beam antenna 2 transmits a link request signal (or beacon signal) from various antenna positions, which are identified by ANT_ID=1, 2, 3 or 4. This sequence of various antenna positions can either be a random sequence or a predefined sequence. In case that the sequence of varying narrow beam antenna positions is a predefined sequence, this information about the predefined sequence could be transmitted to the receiving device 10 in order to accelerate and support the link establishment procedure.

After the transmission of each link request or beacon signal, the narrow beam antenna 2 remains in the same position for a certain time (listening time), as visualised in FIG. 4, during which an answer signal can be received from a receiving device 10. Therefore, in case that a receiving device 10 received the link request signal, the receiving device 10, as will be explained below, can process the received link request signal and send an answer signal (or link confirmation signal) back to the transmitting device 1.

A schematic block diagram of a receiving device 10 according to the present invention is shown in FIG. 3. Hereby, the receiving device 10 comprises all necessary elements and functionalities in order to enable the reception and transmission of signals in the wireless communication system. However, for the sake of clarity, FIG. 3 only shows and explains the elements necessary for the understanding of the present invention.

The receiving device 10 comprises a narrow beam antenna 11 which can be steered to different positions by an antenna steering means 17 under the control of the control means 13. The control means 13 can be a base band controller of the receiving device 10 or any other suitable controlling unit. The control means 13 is connected or comprises a memory 14 in order to store data, information, software, applications and so forth. The receiving device 10 further comprises a transceiver 12 adapted to receive and transmit signals via the narrow beam antenna 11. The transceiver 12 is e.g. implemented as a high frequency or radio frequency unit of the receiving device 10. The receiving device 10 further comprises a channel estimator 15 which is adapted to estimate or obtain information about the channel quality of signals received via the narrow beam antenna 11 and the transceiver 12. The obtained channel quality information is further processed by the control means 13. The receiving device 10 further comprises a signal detecting means 15 which is adapted to detect a received link request signal and particularly information relating to the position of the narrow beam antenna 2 of a transmitting device 1 comprised in a received link request signal. The detected information is then further processed in the control means 13. The receiving device 10 further comprises a signal generating means 18 which is adapted to generate, under the control of the control means 13, the link confirmation signal to the transmitting device 1 from which a link request signal was received via the transceiver 12 and the narrow beam antenna 11.

The link confirmation signal hereby comprises information about the position of the narrow beam antenna of the transmitting device 1 from which the corresponding link request signal was received. This is e.g. visualised in FIG. 4, while the transmitting device 1 transmits link request signals from various positions of the narrow beam antenna 2, the receiving device 10 also changes the position of the narrow beam antenna 11 to various positions trying to listen or receive link request signals (beacon signals) by changing the antenna beam direction. When a link request signal is received in the receiving device 10, the quality of the channel is determined in the channel estimator 15. In case that the channel quality is good enough, the control means 13 causes the generation of a link confirmation signal in the signal generator 18 which is transmitted back to the transmitting device 1, whereby the link confirmation signal comprises information about the position of the narrow beam antenna 2 which was used to transmit the link request signal. This, as explained, takes place while the narrow beam antenna 2 of the transmitting device 1 is still in the same position.

In FIG. 4, the information about the position of the narrow beam antenna 2 which had a sufficient channel quality is named DESIRED_ANT_ID=1, i.e. signifying that the antenna position 1 of the narrow beam antenna 2 had a sufficient quality in the corresponding transmission path. Alternatively, instead of answering immediately as soon as a link request signal over a transmission path with a sufficient channel quality is received in the receiving device 10, the receiving device 10 could change the position of its narrow beam antenna 11 a predefined number of times trying to receive several link request signals, whereby each link request signal is evaluated in relation to the channel quality, whereafter the control means 13 of the receiving device 10 selects the transmission path, i.e. the positions of the narrow beam antennas 2 and 10 associated with the transmission path with the best transmission quality, for the communication link and sends corresponding information back to the transmitting device 1. The schematic example of FIG. 4 explains the situation for a time division duplex system, in which the transmission and the reception of signals takes place sequentially. However, the present invention can also be applied to any other transmission schemes, such as frequency division duplex and so forth.

FIG. 5 also visualises a link establishment procedure between the transmitting device 1 and the receiving device 10. In a first step, the transmitting device 1 is transmitting link request signals (beacon signals) from different positions of the narrow beam antenna 2 according to a predefined or random pattern. At the same time, the receiving device 10 changes the position of the narrow beam antenna 11 also either on the basis of a random pattern or a predefined pattern attempting to receive a link request signal from a transmitting device 1. In a second step, when the receiving device 10 has received one or more link request signals over a transmission path with a sufficient channel quality, a link confirmation signal (or connect request signal) is transmitted back to the transmitting device 1, the link confirmation signal comprising information about the desired position of the narrow beam antenna 2 of the transmitting device 1 (DESIRED_ANT_ID). The transmitting device 1 then, in a third step, acknowledges the requested communication link, whereafter a communication link is established in a fourth step. As visualised in a fifth step during the exchange of information, data and so forth over the established communication link, the transmitting device as well as the receiving device 10 may at certain times change the position of the narrow beam antennas 2 and 11 in order to test alternative transmission paths in case that the current transmission path breaks down or deteriorates.

The structure of the link request signal generated by the signal generator 7 of the transmitting device 1 as well as the structure of the link confirmation signal generated by a signal generator 18 of the receiving device 10 ca be varied and adopted to the respective wireless communication system. For example, as shown in FIG. 6, the link request signal and link confirmation signal may have a structure comprising a preamble, whereby the preamble comprises the information relating to the current position of the narrow beam antenna 2. Eventually, a scrambling code can be applied to the preamble part comprising the information relating to the current position of the narrow beam antenna. Hereby, the data rate of the preamble can be slower than the data part of the link request signal, which is eventually not scrambled. However, the invention is also applicable for other signal structures, e.g., signals without scrambling, a signal in which the data part is also scrambled, a signal without data part and/or a signal which has the information about the current position of the narrow beam antenna in the data part.

In the following, scrambling possibilities performed e.g. in the signal generating means 7 are explained. If the symbol duration of data part is denoted as T, the chip duration of the scrambling code Tc must be T. In this example scrambling is applied on the preamble part $Ts=N\ Tc=NT$ where N is spreading factor and positive integer, and Ts is the symbol duration of the preamble part. If the spreading factor becomes bigger, the received signal to noise ratio (SNR) after descrambling in the receiving device 10 becomes N times higher. The symbol duration of the preamble part Ts becomes N times slower than the symbol rate of data part. For the exchange of the antenna position information ANT_ID, it is not necessary to have a high data rate.

The scrambling code is e.g. chosen as PN sequence which has impulse type autocorrelation function.

Synchronization process based on the scrambled preamble.: As explained above, the autocorrelation function of the scrambling code has impulse (M sequence, Gold code etc.). Therefore by checking the position of the spike from the crosscorrelation between received preamble and known scrambling code, it is possible to obtain timing synchronization in the receiving device 10. Denote the scrambling code as c(t), preamble s(t), and channel h(t), the received signal can be expressed as follows;

$$r(t)=c(t)s(t)h(t) \; t=t, \ldots, t+(N-1)Tc$$

Then the signal after descrambling with timing synchronization becomes $$y(t)=c^*(t)r(t)=N|c(t)|^2 s(t)h(t)$$

where s(t) is known sequence and $|c(t)|^2$ is real constant. Therefore it is possible to estimate h(t), if s(t) is known.

In the following, the phase ambiguity is explained.

When s(t) has information like ANT_ID, the received signal can be expressed $$y_p(t)=c^*(t)r_p(t)=N|c(t)|^3 s_p(t)h(t)$$

Because $s_p(t)$ has information, it's unknown. Assume that $s_p(t)$ is QPSK, it has 4 states 1, −1, j, −j. It causes phase ambiguity.

If we use differential QSPK to generate $s_p(t)$, like $$p=s_p(t)s^*_p(t-Ts)$$

The phase difference between two symbols shows information p, and the phase ambiguity can be ignored.

In the following, the code generation is explained.

The example shown in FIG. 6 has ANT_ID scrambled with scrambling code. The ANT_ID is detected by descrambling the signal. Another idea is shown in FIG. 7, which has multiple layered scrambling codes. Each of primary scrambling code and secondary code are PN sequence or orthogonal codes. For example primary scrambling code is kept for any signal, and secondary scrambling code is selected depend on ANT_ID. In this case, by detecting the secondary scrambling code, it is possible to get AND_ID. The data part could have other information, or keep constant value. This idea is also applicable on connection request signal and DESIRED_ANT_ID.

The terminology used in the present description is explained in the following:

ANT_ID: An ID which indicates the beam direction or position of beam steering antenna. It is assumed that the beam direction or position can be changed step by step, not continuously.

Beacon: Signal transmitted from a radio station to show the existence of the radio station.

Preamble: Additional signal to the data part for the purpose of signal detection, timing recovery, carrier recovery etc.

Beam alignment: The relative directions of the antenna beams. For example when the transmitter's beam is aiming to the receiver and the receiver's beam is aming to the transmitter, one can say the beam are aligned.

Beam direction: Direction of the antenna beam.

Beam steering: To change the antenna beam direction.

Channel quality: A index showing the quality of the communication channel. For example if a preamble is chosen as PN sequence, the cross correlation value between received preamble part and its replica shows the received signal strength and noise level. If the signal strength is much bigger than noise level, it can say that the channel quality is high.

Connection request signal: A signal to request establishing a link after receiving beacon signals.

DESIRED_ANT_ID: The ANT_ID which is desired and indicated from S2 to S1 when it sends communication request signal. The DESIRED_ANT_ID is chosen based on channel quality of received beacons.

Orthogonal code: A code which have zero cross-correlationi. For example, Walsh function.

The general idea of the present invention and some advantageous implementations are again explained in the following. The general idea of the present invention is to put antenna direction information ANT_ID on a link request or beacon signal in order to show ANT_ID currently used. Further advantageous implementation ideas and examples are to transmit said beacon signals with ANT_ID by changing beam directions for each as shown in FIG. 4, to transmit a communication request or link confirmation signal with the desired beam direction information DESIRED_ANT_ID, which is chosen besed on received said beacons with ANT_ID. to keep the beam direction of the transmitter during "listening time" as shown in FIG. 4, to put ANT_ID information on preamble of said beacon signal and/or communication request signal, to apply scrambling on said beacon and/or connection request message with scrambling code in order to have spreading gain. The following ideas can also be implemented according to the present invention:

A wireless receiver which makes the synchronization process of carrier frequency, phase and timing (or some of them) based on said preamble.

The antenna direction information ANT_ID is modulated as a differential phase shift keying modulation or a differential code. It can avoid the phase ambiguity of modulation signal.

The signal has primary and secondary scrambling codes and the secondary code is chosen depend on ANT_ID for beacon signal or DESIRED_ANT_ID for connection request signal.

PN sequence or orthogonal code is used for the secondary scrambling code.

The pattern of beam direction can be random, or predefined pattern.

The predefined pattern can be informed from the transmitter to the receiver.

The invention claimed is:

1. A method for establishing a wireless communication link between a first communication device and a second communication device, said first communication device having an antenna beam operable at different positions, the method comprising transmitting a link request signal from said first communication device to said second communication device via said beam antenna beam, wherein said link request signal comprises information relating to a current position of the antenna beam; and obtaining, in case said link request signal is received in said second communication device, channel quality information representative of a current transmission path.

2. The method according to claim 1, wherein said antenna beam is steered to different positions and a link request signal is transmitted for each position, each of the link request signals comprising information relating to the respective position of said antenna beam via which it is transmitted.

3. The method according to claim 2, wherein a sequence of the different positions of said antenna beam is based on a predefined pattern.

4. The method according to claim 3, wherein said first communication device transmits information about said predefined pattern to said second communication device.

5. The method according to claim 2, wherein a sequence of the different positions of said antenna beam is based on a random pattern.

6. The method according to claim 2, wherein the first communication device, after transmission of each link request signal, keeps the antenna beam in the just used position in order to be able to receive an answer signal from a second communication device.

7. The method according to claim 2, wherein said second communication device, for each of said link request signals received in said second communication device, obtains channel quality information representative of the respective transmission path.

8. The method according to claim 7, wherein said second communication device, on the basis of the obtained channel quality information, determines a suitable transmission path for a communication link with said first communication device and sends a link confirmation signal comprising information relating to the corresponding position of the antenna beam of the first communication device to said first communication device.

9. The method according to claim 1, wherein said link request signal comprises a preamble, said preamble comprising the information relating to the current position of the antenna beam.

10. A transmitting device for transmitting signals in a wireless communication system, comprising
an antenna beam operable at different positions
a signal generating unit configured to generate a link request signal comprising information relating to a current position of the antenna beam, and
a transmitting unit configured to transmit said link request signal to a receiving device via said antenna beam.

11. The transmitting device according to claim 10,
wherein said signal generating unit is configured to generate link request signals comprising information relating to each position of said antenna beam, wherein when an antenna steering unit steers said antenna beam to different positions, a link request signal is transmitted for each position, each of the link request signals comprising information relating to the respective position of said antenna beam via which it is transmitted.

12. The transmitting device according to claim 11,
wherein said antenna steering unit steers said antenna beam to the different positions based on a predefined pattern.

13. The transmitting device according to claim 12,
wherein said transmitting unit is configured to transmit information about said predefined pattern to a receiving device.

14. The transmitting device according to claim 11,
wherein said antenna steering unit steers said antenna beam to the different positions based on a random pattern.

15. The transmitting device according to claim 11,
wherein, after transmission of each link request signal, the antenna beam is kept in the just used position in order to be able to receive an answer signal from a receiving device.

16. The transmitting device according to claim 10, further comprising;
a receiving unit configured to receive from a receiving device a link confirmation signal comprising information relating to a position of the antenna beam which is to be used for a communication with said receiving device.

17. The transmitting device according to claim 10,
wherein said link request signal comprises a preamble, said preamble comprising the information relating to the current position of the antenna beam.

* * * * *